Feb. 5, 1924.
W. NELSON
MAP AND HOLDER
Filed April 18, 1923
1,482,695
3 Sheets-Sheet 1
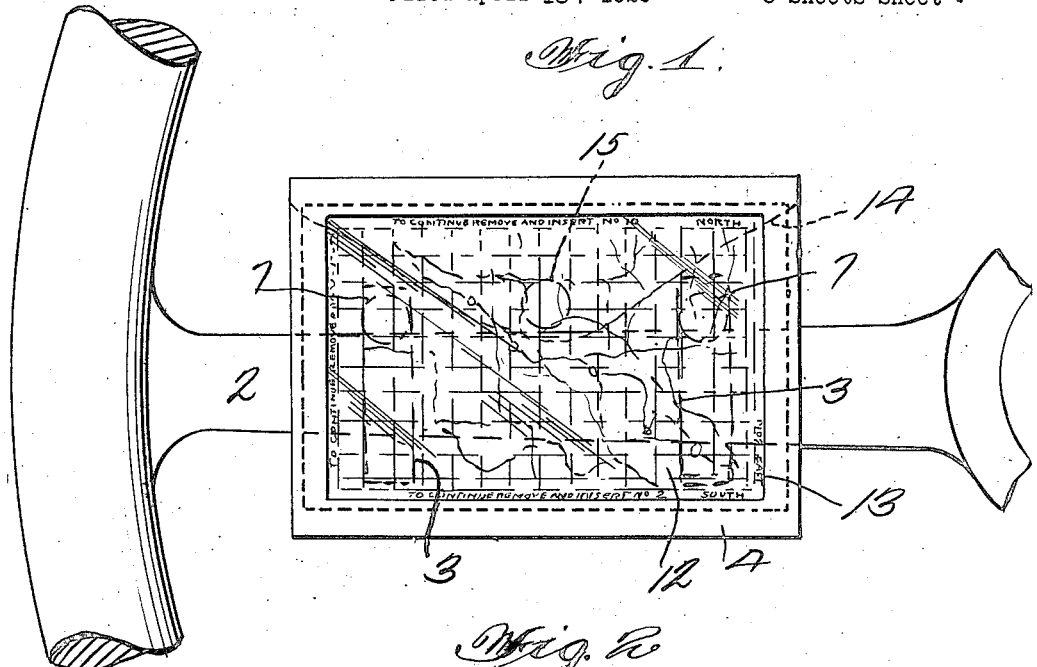
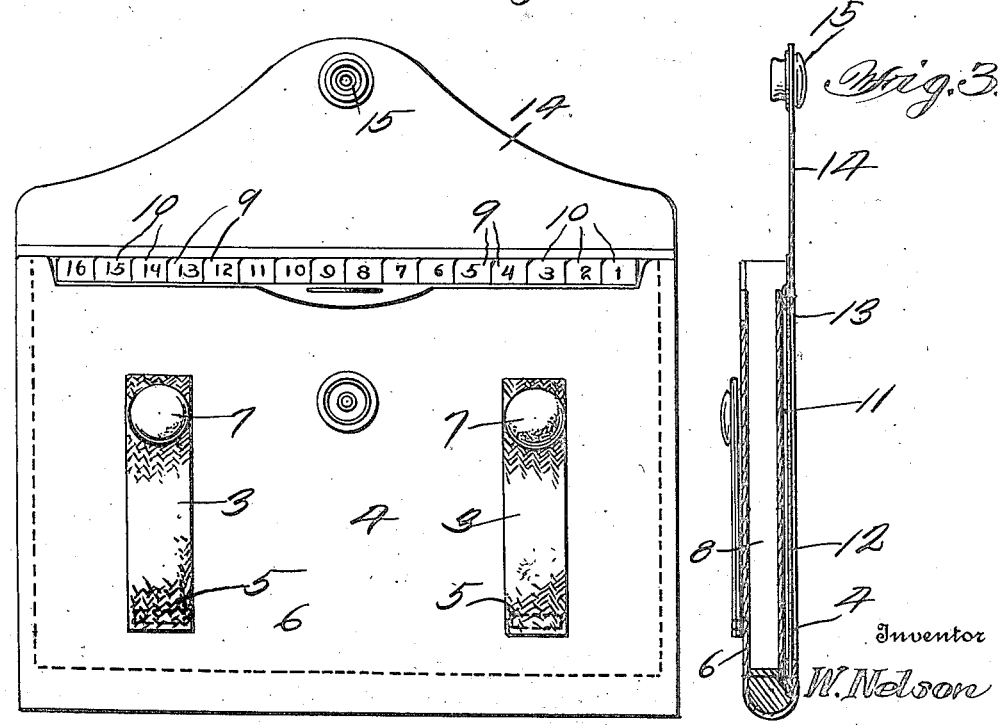
Inventor
W. Nelson
By
Attorney

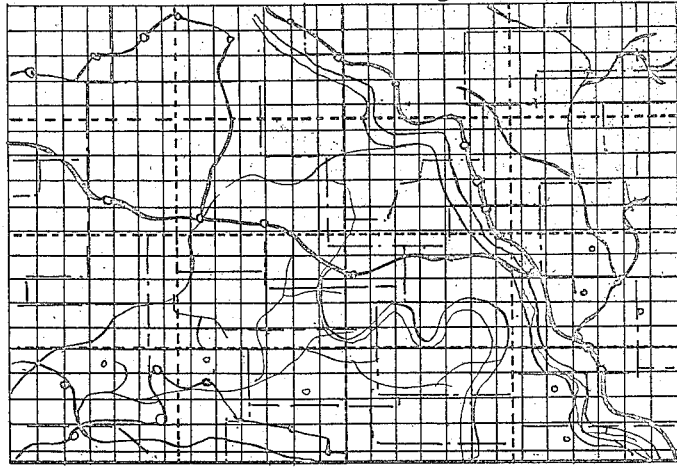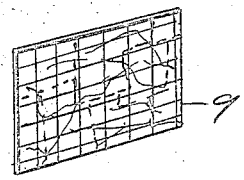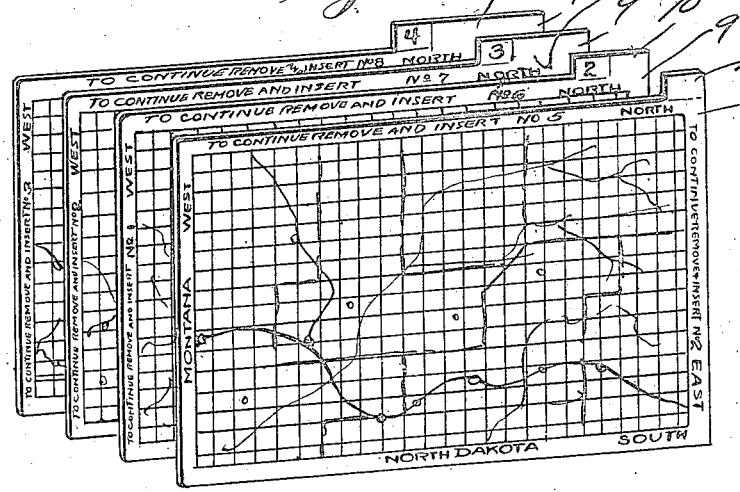

Feb. 5, 1924.
W. NELSON
MAP AND HOLDER
Filed April 18, 1923
1,482,695
3 Sheets-Sheet 3
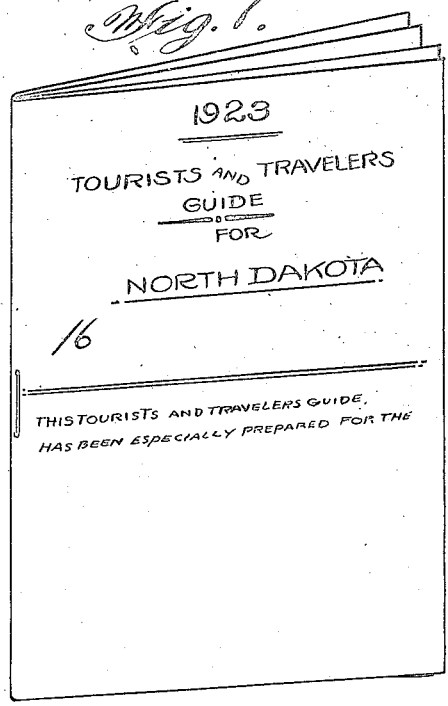
Fig. 7.
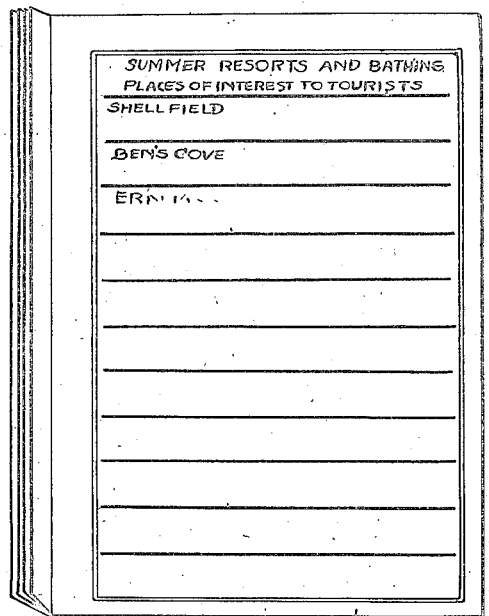
Fig. 8.
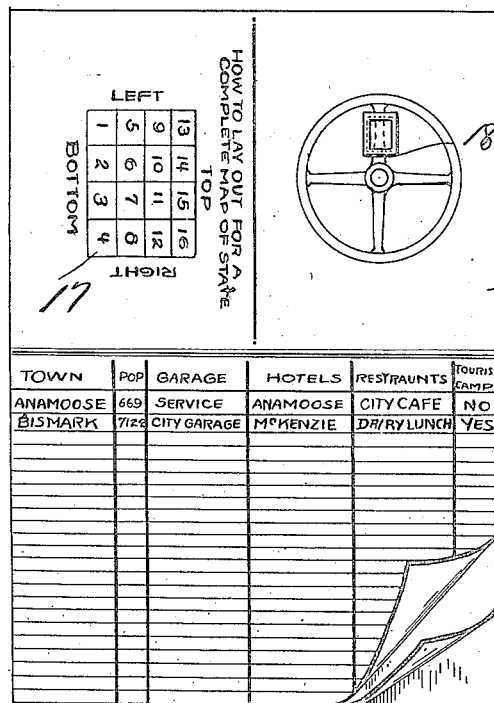
Fig. 9.
Inventor
W. Nelson
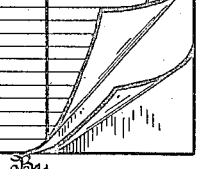
By
Attorney Patented Feb. 5, 1924.

1,482,695

UNITED STATES PATENT OFFICE.

WALTER NELSON, OF OBERON, NORTH DAKOTA.

MAP AND HOLDER.

Application filed April 18, 1923. Serial No. 632,893.

*To all whom it may concern:*

Be it known that I, WALTER NELSON, a citizen of the United States, residing at Oberon, in the county of Benson, State of North Dakota, have invented a new and useful Map and Holder; and I do hereby declare the following to be a full, clear, and exact description of the invention, such as will enable others skilled in the art to which it appertains to make and use the same.

The invention relates to automobile maps and holders, and has for its object to provide a device of this character having a plurality of numbered map sections disposed therein, which sections are adapted to be placed beneath a transparent member carried by the holder where it may be easily observed. Also to provide the holder with means whereby it may be easily and quickly attached to a steering wheel in a position where it may be observed at all times by the operator during the steering operation.

A further object is to provide the edges of the map sections with indicia, by means of which the operator may easily ascertain the number of the map section on which contiguous territory is shown.

A further object is to provide the under side of the holder with resilient straps adapted to pass around the spoke of a wheel and support the holder. The resilient strap forms means whereby the holder may be attached to various sizes of spokes.

A further object is to provide the holder with an instruction blank showing a method of dividing the map and the method of attaching the device. Also to provide means whereby a tourist guide may be utilized in connection with the device.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a top plan view of the device showing the same applied to the steering wheel.

Figure 2 is a bottom plan view of the card holder.

Figure 3 is a transverse sectional view through the holder, showing the same open.

Figure 4 is a plan view of the map, showing the division line for forming the map into sections.

Figure 5 is a perspective view of adjacent map sections.

Figure 6 is a perspective view of one of the map sections before indexing.

Figure 7 is a perspective view of the tourist's and traveler's guide book.

Figure 8 is a perspective view showing the book partially open.

Figure 9 is a view of the book showing the same open to the instruction page.

Referring to the drawings, the numeral 1 designates a conventional form of steering wheel, and 2 one of the spokes thereof. Secured to the spoke 2 by means of straps 3 is the map container 4, said straps are attached at 5 to the underside 6 of the container and have their ends provided with conventional forms of snaps 7, which snaps attach to the underside of the container 4 after the straps 3, which are resilient, are passed under the spoke 2, therefore it will be seen that the container will be supported in a horizontal plane on the spoke. By providing resilient straps 3, it is obvious that the straps may be passed around spokes of different cross sectional area, and consequently the device may be attached to various sizes and types of steering wheels.

The container 4 is provided with a compartment 8 for the reception of a plurality of map sections 9, which map sections are provided with numbered tabs 10 so that any particular map section may be easily and quickly located and removed from the compartment 8 and placed within the pocket 11 of the container below the transparent member 12 where it may be easily observed by the operator of the machine through the rectangular shaped opening 13 in one side of the container. The container is provided with a flap 14, which flap is provided with a conventional form of snap 15 whereby the flap may be held in closed position for preventing entrance of foreign matter to the container.

The map sections 9 are formed from a single map 9ᵃ, the map 9ᵃ, for instance including an entire State, however the map sections 9 are formed by cutting the map 9ᵃ into sections, preferably starting from the left at the bottom and consecutively numbering the sections so cut, the last number ending at the upper right hand corner; sixteen sections being preferably provided. The sections 9 after being formed from a single map 9ª are provided with tab members on the tabs 10 as shown, therefore it will be seen that any particular section of the map 9ª may be located. The marginal edges of the map sections 9ª are provided with indicia whereby when the operator of the automobile reaches a point where its course would extend over territory shown on another section, the particular section which should be removed from the receptacle 8 to replace the map section in use may be selected by its number. The map sections preferably have thereon all main trails for automobiles, or any other subject matter.

Referring to Figures 7 to 9 inclusive, it will be seen that a tourist's guide book 16 is provided, in which various subject matter may be printed, for instance as shown in Figure 8, summer resorts and bathing places may be set forth, and as shown in Figure 9, information relative to garage and service in particular towns, hotels, restaurants, and tourists' camps. Also printed in the book as shown in Figure 9 at 17 is a chart showing the method by which the map of the State is formed and at 18 the place for attaching the container to the steering wheel.

From the above it will be seen that a sectional map container is provided which may be easily and quickly attached to the spoke of a steering wheel and one wherein a plurality of map sections are provided, and adjacent map sections may be numerically selected.

The invention having been set forth what is claimed as new and useful is:—

The combination with a spoke of a steering wheel, of a map container carried thereby, the underside of said map container being provided with resilient straps adapted to extend under the spoke, means carried by said straps at their free ends whereby they may be attached to the underside of the container, a partition wall disposed within the container and dividing the same into a map section receiving compartment adjacent the underside of the container and a map receiving compartment adjacent the upper side of the container, and a transparent member carried by the upper side of the container and forming the upper wall of the last named map receiving compartment.

In testimony whereof I have signed my name to this specification in the presence of two subscribing witnesses.

WALTER NELSON.

Witnesses:
E. S. SWANSON,
WM. LINDAHL.